United States Patent [19]
Riedesel

[11] 3,955,826
[45] May 11, 1976

[54] MATTRESS CARRIER

[75] Inventor: Ernest H. Riedesel, Bennett, Iowa

[73] Assignee: Raymond Lee Organization Inc., a part interest

[22] Filed: Feb. 18, 1975

[21] Appl. No.: 550,667

[52] U.S. Cl. .............................. 280/35; 280/79.3; 211/28
[51] Int. Cl.² ........................................ B62D 21/14
[58] Field of Search ............ 280/35, 47.13 R, 79.1, 280/34 R, 34 A, 79.3; 211/28; 296/26

[56] References Cited
UNITED STATES PATENTS

| | | | |
|---|---|---|---|
| 2,174,870 | 10/1939 | Daniels | 280/79.3 |
| 2,606,683 | 8/1952 | Rudd | 280/79.2 X |
| 3,136,429 | 6/1964 | Kleinschmidt | 211/28 |
| 3,278,042 | 10/1966 | Frydenberg | 280/35 |
| 3,580,602 | 5/1971 | Hebert | 280/79.3 |
| 3,633,774 | 1/1972 | Lee | 214/152 |
| 3,782,748 | 1/1974 | Poland | 280/79.1 |

*Primary Examiner*—Robert R. Song

[57] ABSTRACT

Apparatus for carrying a mattress using a horizontal rectangular open frame adjustable in width and length. A plurality of parallel U shaped members are used. Each member is secured at each end to a corresponding side of the frame, extends downward therefrom and then extends transversely between the sides of the frame. A horizontal platform is supported on vertical wheels. The top of the platform carries manually operable clips detachably securable to the transversely extending sections of the members. Alternatively, casters may be detachably secured to the bottoms of the members.

3 Claims, 5 Drawing Figures

MATTRESS CARRIER

SUMMARY OF THE INVENTION

Mattresses for single or double beds are difficult for one person to move from one room to another or to other locations because such mattresses are not rigid but rather are flexible and thus are not readily held in fixed positions as is required for ease in moving. As a result, it is often necessary to use two or more individuals in moving individual mattresses.

This invention is directed toward apparatus which will enable a mattress to be moved easily by one person. This apparatus enables the mattress to be held in essentially rigid position whereby it can be carried more easily or rolled.

To this end, the apparatus employs a horizontal rectangular open frame. A plurality of parallel U shaped members are used. Each member is secured at each end to a corresponding side of the frame, extends downward therefrom and then extends transversely between the sides of the frame.

In use, the mattress to be moved is disposed vertically and dropped through the frame until the bottom horizontal edge of the mattress bears against the transverse sections of the members. One person can then pull the frame to roll the apparatus with the mattress therein from one position to another. The frame can be adjusted in overall length and in overall width to provide an appropriate fit for different sizes of mattresses.

The apparatus can also employ a horizontal platform supported on wheels. The top of the platform carries a plurality of manually operable clips detachably engagable or securable to the transverse sections of the straps. When the platform is used, apparatus is thus available to enable a mattress, disposed vertically, to be moved, on wheels, as desired. Alternatively, the members themselves can receive detachable casters.

DETAILED DESCRIPTION OF PREFERRED EMBODIMENTS

Figure 1:
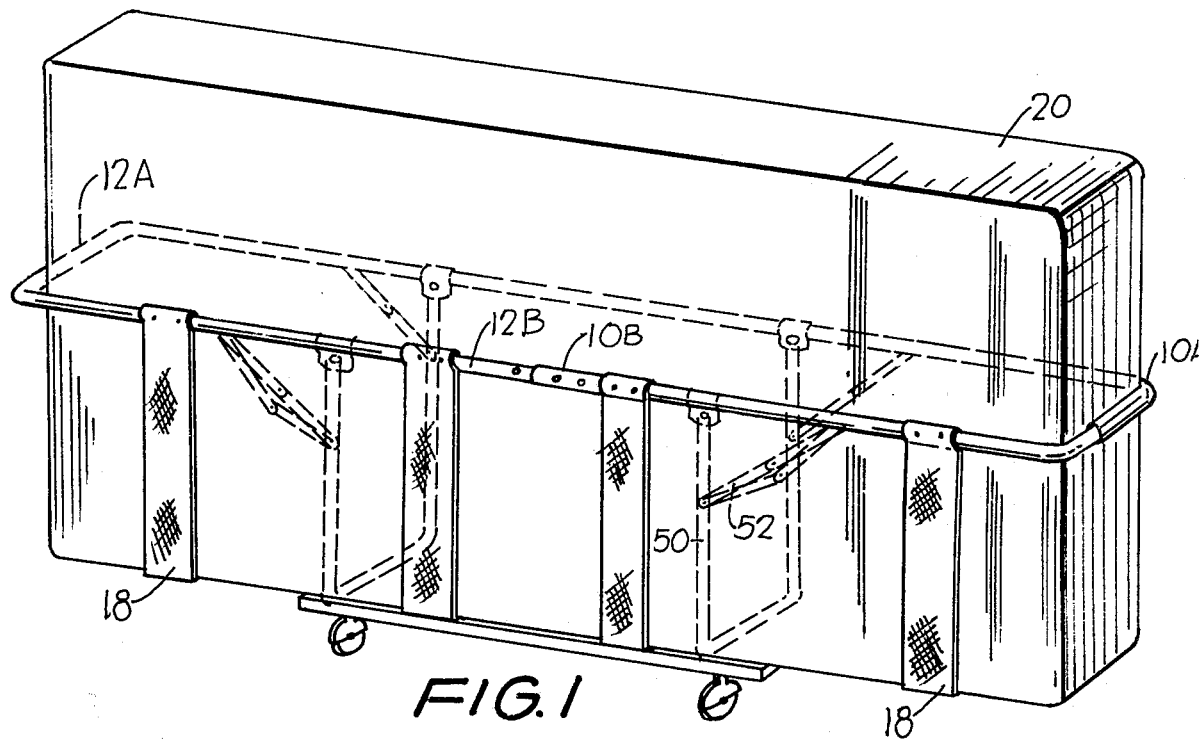
FIG. 1 is a perspective view of the invention in use.
Figure 2:
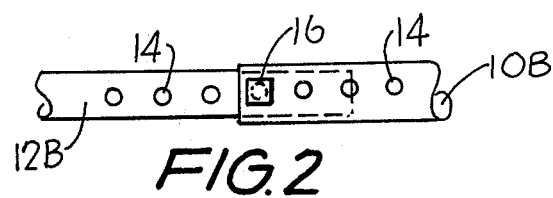
FIG. 2 is a detail view showing the frame adjustment means.

Referring now to FIGS. 1–4, a horizontal rectangular open frame is formed using two U shaped hollow tubular members 10 and 12. Each free end of each leg of member 10 fits telescopically within the corresponding free end of the corresponding leg of member 12. By varying the depth of penetration, the overall length of the frame can be adjusted. These ends have spaced sets of oppositely disposed holes 14. When a selected overall length is set, the holes of the telescopically fitted ends are aligned and bolts 16, pins or the like are removably inserted through aligned sets to "lock" the members in desired position.

Each member consists of two L shaped components 10A and 10B and 12A and 12B. The short leg of components 10A and 12A fits telescopically into the short leg of components 10B and 12B respectively. These legs have spaced sets of oppositely disposed holes which are aligned and employ bolts or pins 16 in the same manner as before to adjust the overall width of the frame.

Alternatively the bolts or pins can be replaced by spring loaded button controlled locking mechanisms.

A plurality of parallel U shaped flexible nylon straps 18 are employed. Each strap is secured at each end to a corresponding side of the frame, extending downward therefrom and then extending transversely between the sides of the frame. A mattress 20 can be placed in the structure so formed and the arrangement can be pulled or carried for short distances. Alternatively, as shown in phantom in FIG. 1, the straps can be replaced by rigid U shaped tubular members 50 which are hollow. Braces 52 can provide more rigidity. These braces can be in two hinged parts.

A horizontal platform 22 can have vertical casters 24 secured to the bottom thereof. A plurality of manually operable clips 26 secured to the top surface of the platform can each be detachably secured to a corresponding transverse section of a corresponding strap 18 to enable the mattress to be moved on wheels.

Figure 5:
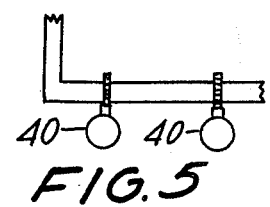
FIG. 5 is a detail view showing casters secured detachably to the member.
Figure 3:
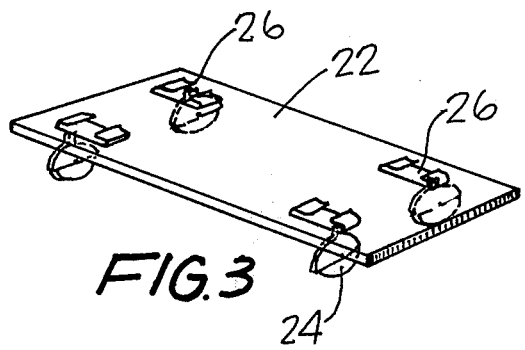
FIG. 3 is a detail view of the wheeled platform used in the invention.
Figure 4:
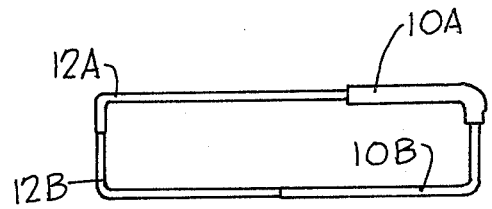
FIG. 4 is a plan view of the frame used in the invention.

Alternatively casters 40 can be detachably secured to the bottom of members 50 to eliminate use of platform 22 as shown in FIG. 5.

While the invention has been described with specific reference to the drawings, the protection sought is to be limited only by the terms of the claims which follow.

What is claimed is:

1. Apparatus for carrying a mattress, comprising:
   a horizontal rectangular open frame having first and second U-shaped hollow tubular members, the free ends of the legs of one member fitting telescopically within the corresponding free ends of the corresponding legs of the other member whereby the overall length of the frame can be varied;
   a plurality of rigid, parallel U-shaped members, each member being slidibly secured at each end to a corresponding side of the frame, extending downwardly therefrom and then extending transversely between the sides of the frame; and
   brace means securing the members to the frame for additional rigidity.

2. Apparatus of claim 1 wherein each member is constituted by two L shaped components, the short leg of one component fitting slidably within the short leg of the other component whereby the overall width of the frame can be adjusted.

3. Apparatus of claim 2 further including casters detachably secured to the bottoms of said members.

* * * * *